(12) United States Patent
Fan

(10) Patent No.: US 7,891,685 B2
(45) Date of Patent: Feb. 22, 2011

(54) SCOOTER DRIVING STRUCTURE

(75) Inventor: Jeeng-Neng Fan, Taoyuan (TW)

(73) Assignee: Hsin Lung Accessories Co., Ltd., Hsin Chu Hsien (TW)

( * ) Notice: Subject to any disclaimer, the term of this patent is extended or adjusted under 35 U.S.C. 154(b) by 0 days.

(21) Appl. No.: 12/588,370

(22) Filed: Oct. 14, 2009

(65) Prior Publication Data

US 2010/0283217 A1 Nov. 11, 2010

(30) Foreign Application Priority Data

May 7, 2009 (TW) .............................. 98207789 U

(51) Int. Cl.
*B62M 1/00* (2010.01)

(52) U.S. Cl. .................... 280/221; 280/87.01; 280/220; 280/261

(58) Field of Classification Search ......... 280/253–261, 280/87.01, 87.041, 210, 221, 220
See application file for complete search history.

(56) References Cited

U.S. PATENT DOCUMENTS

| | | | | |
|---|---|---|---|---|
| 4,691,931 A * | 9/1987 | Vincent | ................ | 280/11.115 |
| 5,368,321 A * | 11/1994 | Berman et al. | ............... | 280/221 |
| 6,796,570 B1 * | 9/2004 | Chang | ......................... | 280/255 |
| 6,857,648 B2 * | 2/2005 | Mehmet | ..................... | 280/217 |
| 7,621,547 B1 * | 11/2009 | Fan | ............. | 280/221 |
| 2002/0163159 A1 * | 11/2002 | Christensen et al. | ........ | 280/252 |
| 2005/0194759 A1 * | 9/2005 | Chen | ......................... | 280/221 |
| 2007/0120341 A1 * | 5/2007 | Pasternak | .................... | 280/221 |
| 2009/0200768 A1 * | 8/2009 | Armand et al. | ............. | 280/221 |
| 2010/0001487 A1 * | 1/2010 | Pang | ......................... | 280/221 |
| 2010/0187790 A1 * | 7/2010 | Yu | ............. | 280/221 |
| 2010/0207349 A1 * | 8/2010 | Chiu et al. | .................. | 280/221 |

* cited by examiner

*Primary Examiner*—Lesley Morris
*Assistant Examiner*—Tashiana Adams
(74) *Attorney, Agent, or Firm*—Rosenberg, Klein & Lee

(57) ABSTRACT

A scooter driving structure includes a step member pivotally coupled to a scooter platform and swingable up and down, a first driving module installed at a position corresponding to the step member and comprising a driving rod, a guide wheel, a first driving wheel, a first driving belt and a position restoring element, and at least one second driving module installed between a pivotal axle of the first driving wheel and an axle center of a rear wheel and comprising a second driving wheel, a second driven wheel and a second driving belt. The step member is pedaled to move the driving rod of the first driving module and drive the first driving belt to rotate the first driving wheel, and the coaxial second driving wheel of the second driving module drives the second driven wheel and the rear wheel to rotate through the second driving belt, so as to achieve a dual drive effect of driving a scooter to move.

8 Claims, 8 Drawing Sheets

SCOOTER DRIVING STRUCTURE

BACKGROUND OF THE INVENTION

1. Field of the Invention

The present invention relates to an improved scooter driving structure, and more particularly to an improved scooter driving structure having the features of a simple structure, and a simple, easy and convenient use, and providing a stable operation for an exercise with fun, and the novel scooter driving structure gives a feasible solution to improve over the prior art.

2. Description of the Related Art

In general, a conventional scooter as shown in FIG. 1 includes a scooter platform 11, an operation control rod 12 and two wheels 13, wherein the operation control rod 12 is pivotally coupled onto the scooter platform 11 and a handlebar 121 is installed onto the control rod 12; and the two wheels 13 are pivotally installed on two opposite sides of the scooter platform 11, and one of the wheels 13 is linked to the operation control rod 12 for controlling a driving direction of the scooter. When the scooter is in use, a user stands on the scooter platform 11 by one leg, and performs a pedaling movement with respect to the ground by another leg, such that the scooter can slide freely forward. As the sliding speed of the scooter slows down, the user can continue the pedaling movement to maintain the speed of the scooter. However, such pedaling movement made by the user's leg gives a very limited speed, a high instability and a monotonous movement, and thus the conventional scooter requires further improvements.

In view of the drawbacks of the aforementioned conventional scooter, some manufacturers developed a front pedaling scooter as shown in FIG. 2, and the front pedaling scooter includes a pedal 14 pivotally installed to the top of a front end of the scooter platform 11, a swinging arm 141 installed at a front end of the pedal 14, a first driving wheel 142 pivotally installed at a front end of the swinging arm 141, a first driven wheel 15 installed at a rear end of the scooter platform 11, a second driving wheel 16 rotating in a one-way direction and installed coaxially with the first driven wheel 15, a second driven wheel 17 installed coaxially with the rear wheel 13, a first driving chain 18 with an end fixed to the top of a front end of the scooter platform 11, and another end wound around the first driving wheel 142 and the first driven wheel 15 and then pulled by an elastic element 19 to the bottom at the front of the scooter platform 11, a second driving chain 20 installed round and between the second driving wheel 16 and the second driven wheel 17, such that the user can step on the pedal 14 for reciprocally u and down movements, and the first driving wheel 142 can move together with the back and forth movement of the swinging arm 141 to pull the first driving chain 18, and the coaxial first driven wheel 15 and second driving wheel 16 are driven to rotate, and the second driving chain 20 is provided to drive the coaxial second driven wheel 17 and rear wheel 13 to rotate synchronously to drive the scooter to move forward. Although this scooter can achieve the effect of driving the scooter by pedaling, yet it has the following drawbacks:

1. Since the pedaling and driving components are installed at upper and lower section of front and rear ends of the scooter platform, the entire scooter platform is installed with pedaling and driving components, which obviously occupy much space and incur complicated packaging and inconvenient transportation procedures for a simple-structured scooter.

2. Since the user stands on the scooter platform with one leg, and pedal the step member to move up and down by another leg, the front pedal operation is rather not natural or ergonomic, and the exercise movement is monotonous and boring.

Therefore, some manufacturers developed a rear pedaling scooter as shown in FIG. 3, and the scooter comprises a pedal 21 pivotally coupled to the top of a rear end of the scooter platform 11, a swinging arm 211 installed under the pedal 21, a first driving wheel 212 pivotally installed at an end of the swinging arm 211, a second driving wheel 22 installed coaxially with the rear wheel 13 and rotated in a one-way direction, a guide wheel 23 installed to the scooter platform 11 and at a rear end of the second driving wheel 22, an elastic element 24 installed under a front end of the scooter platform 11, a pulley 25 installed at a rear end of the elastic element 24, and a driving chain 26 with an end fixed to a rear end of the scooter platform 11 and another end wound around the first driving wheel 212, the second driving wheel 22, the guide wheel 23 and the pulley 25 and then installed to the scooter platform 11, such that a user can step on the pedal 21 for up and down movements, and the first driving wheel 212 can swing back and forth with the swinging arm 211 to pull the driving chain 26 and drive the coaxial second driving wheel 22 and rear wheel 13 to rotate. With the pulling force of the elastic element 24 and the one-way rotation of the second driving wheel 22, the pedal 21 can be moved reciprocally up and down to rotate the rear wheel 13 to drive the scooter to move forward. Since the pedaling and driving components are concentrated at the rear end of the scooter platform 11, such arrangement does not occupy that much space and incur simple packaging procedure and a convenient transportation for the simple-structured scooter. In the meantime, the way of pedaling backward by a user's leg for the operation of the scooter is more natural and ergonomic, and the rear pedaling scooter can improve the aforementioned shortcomings. However, the practical application still has the drawback of a slow moving speed. In other words, the rear wheel 13 and its coaxial second driving wheel 22 are rotated by the swing of the swinging arm 211 that pulls the driving chain 26, and there is limited space at the rear end of the scooter platform 11, and the swinging amplitude of the swinging arm 211 is very limited. As a result, the swinging arm 211 can produce a small swing each time when the pedal 21 is pedaled, and the pulled distance of the driving chain 26 is short and the round per minute of the second driving wheel 22 and the rear wheel 13 is small, and thus the scooter cannot be accelerated effectively. If it is necessary to improve the speed, then the user has to step on the pedal continuously in order to increase the pedaling frequency, but the user will be exhausted and the exercise is no longer of fun anymore.

SUMMARY OF THE INVENTION

Therefore, it is a primary objective of the present invention to provide an improved scooter driving structure to overcome the aforementioned shortcomings of the prior art and make the operation of the scooter quicker, stabler and more fun.

To achieve the foregoing objective, the present invention provides an improved scooter driving structure comprising: a step member installed at a rear end of a scooter platform and swung up and down, a first driving module installed downwardly at a position corresponding to the step member and comprising a driving rod, a guide wheel, a first driving wheel, a first driving belt and a position restoring element, and at least one second driving module installed between the pivotal axle of the first driving wheel and the rear wheel axle center and including a second driving wheel, a second driven wheel and a second driving belt, such that when the step member is stepped downward, the driving rod of the first driving module is moved together to drive the first driving belt to rotate first driving wheel, and the second driving wheel coaxial with the second driving module is driven by the second driving belt to rotate the second driven wheel and its coaxial rear wheel, so as to achieve the dual driving effect of moving the scooter in a high speed.

To make it easier for our examiner to understand the objects, characteristics and effects of the present invention, we use preferred embodiments and related drawings for the detailed description of the present invention as follows.

DETAILED DESCRIPTION OF THE PREFERRED EMBODIMENTS

Figure 1:
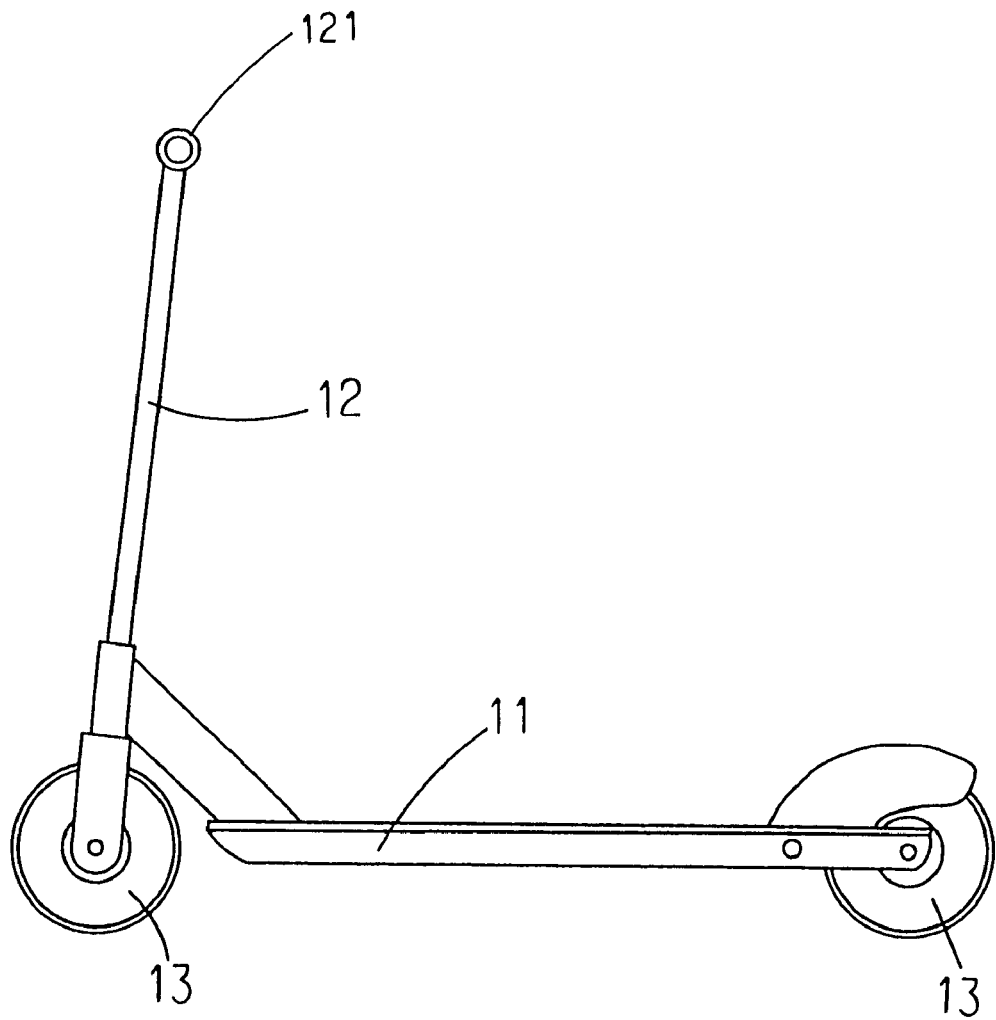
FIG. 1 is a planar view of a conventional scooter.
Figure 2:
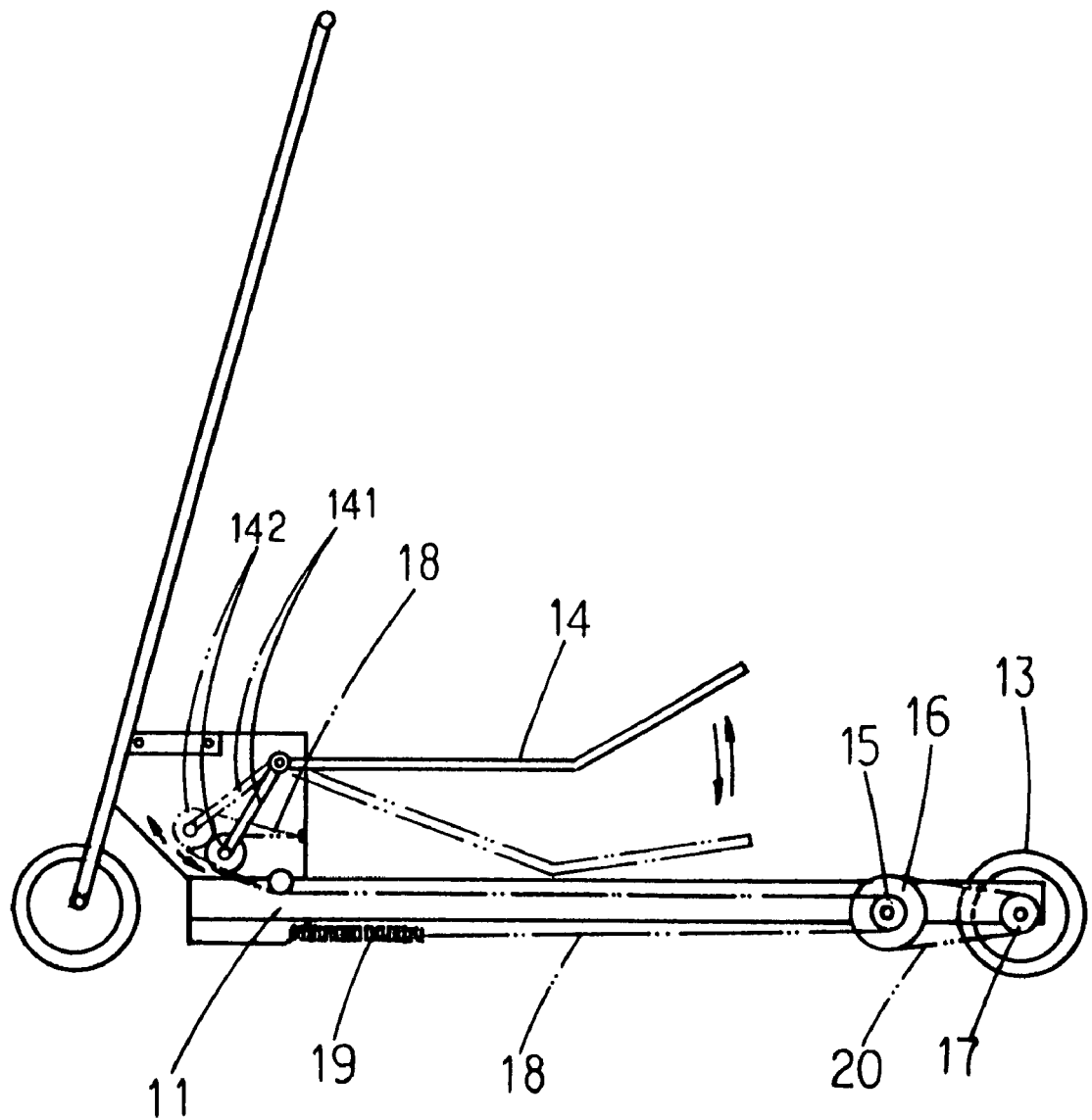
FIG. 2 is a planar view of a conventional front pedaling scooter.
Figure 3:
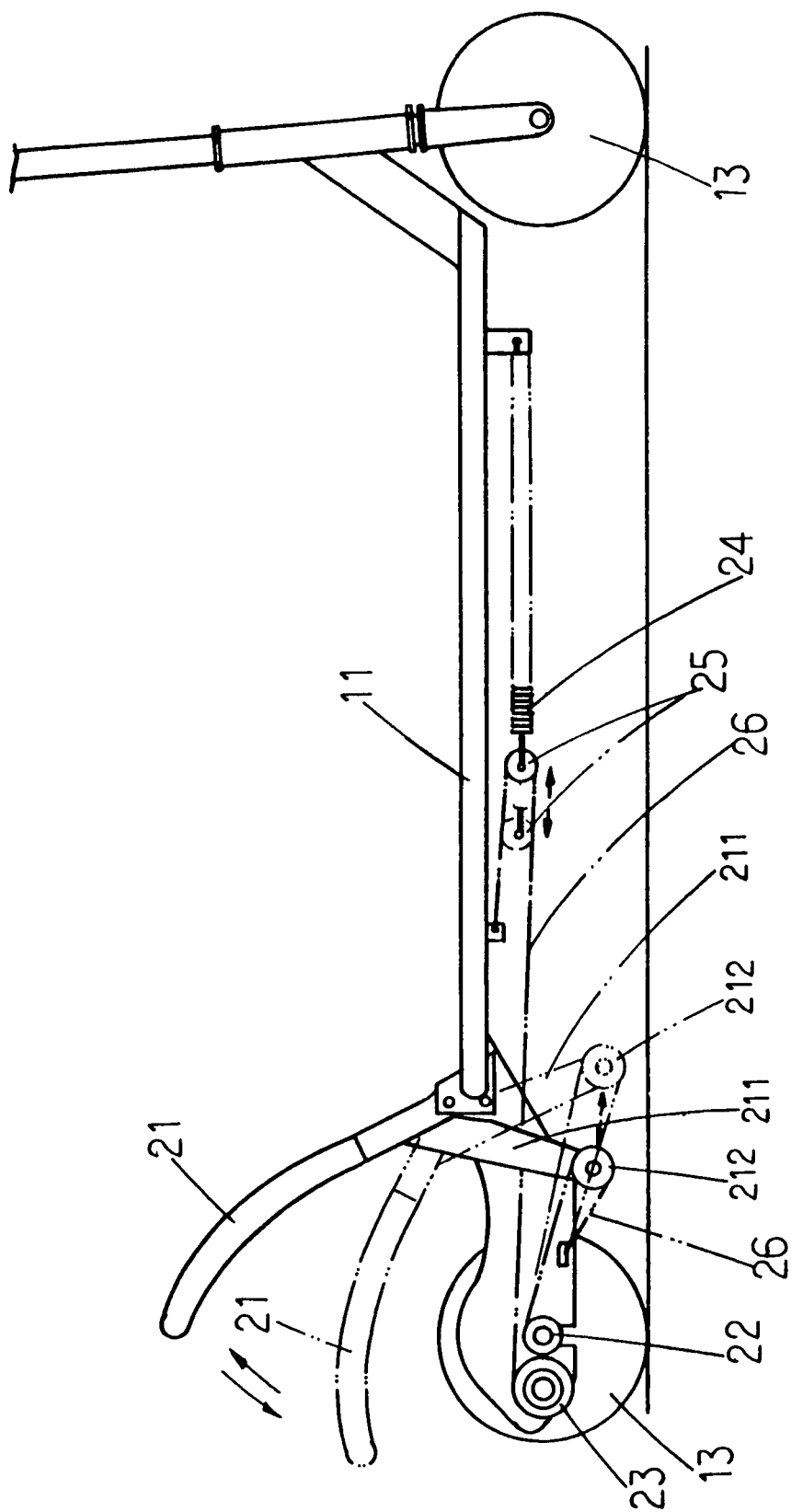
FIG. 3 is a planar view of a conventional rear pedaling scooter.
Figure 4:
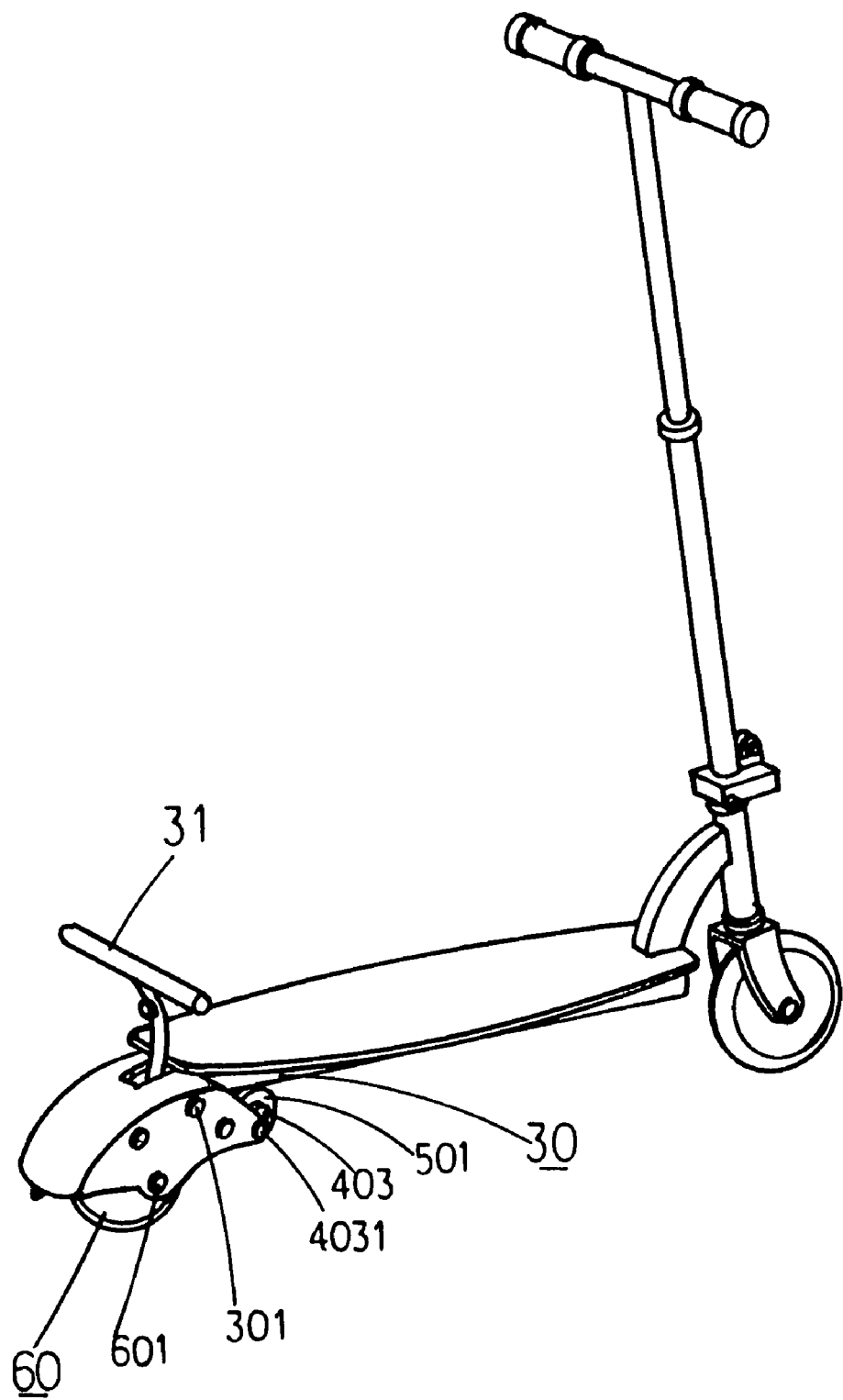
FIG. 4 is a perspective view of a scooter in accordance with a preferred embodiment of the present invention.
Figure 5:
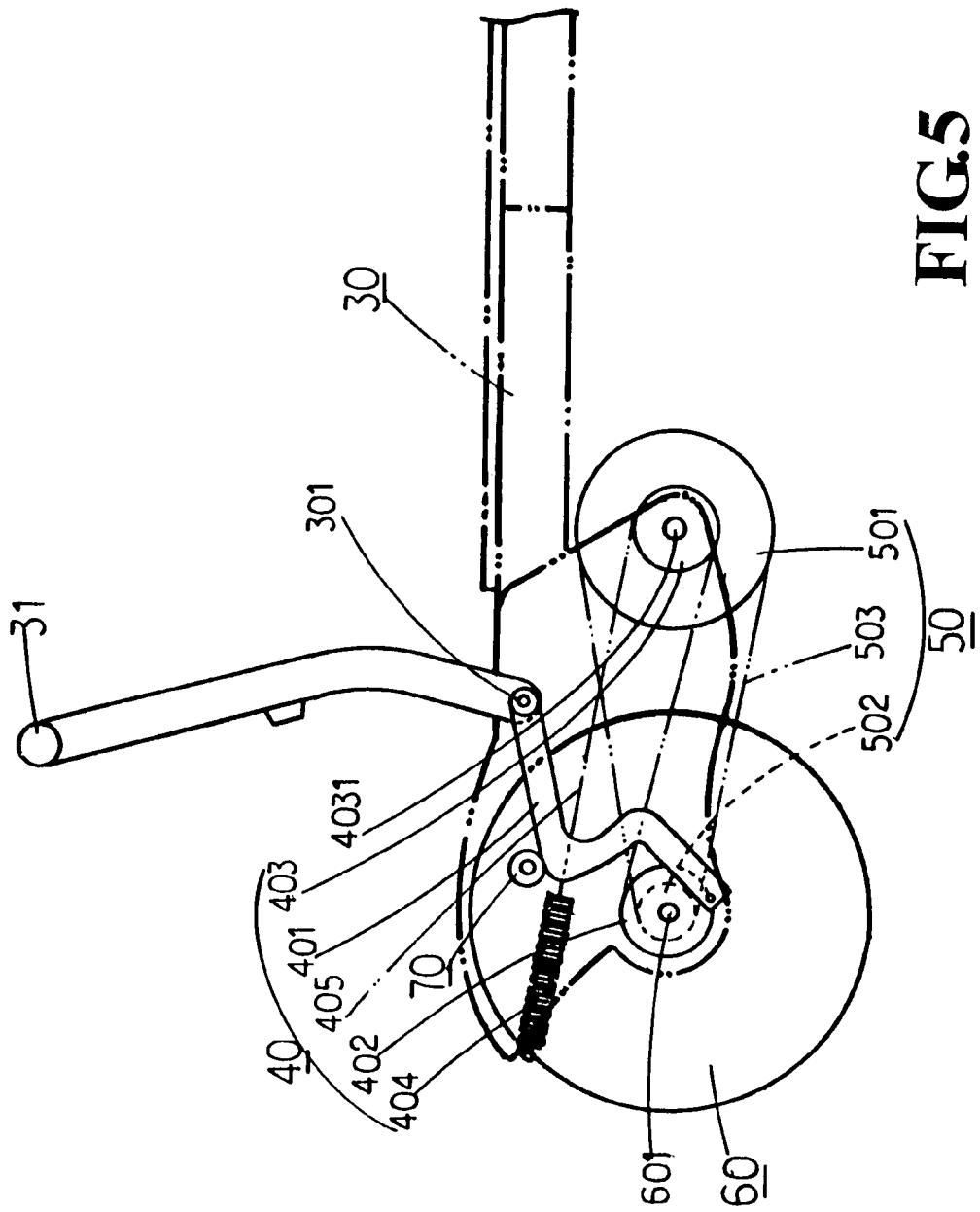
FIG. 5 is a front view of a scooter driving structure in accordance with a preferred embodiment of the present invention.
Figure 6:
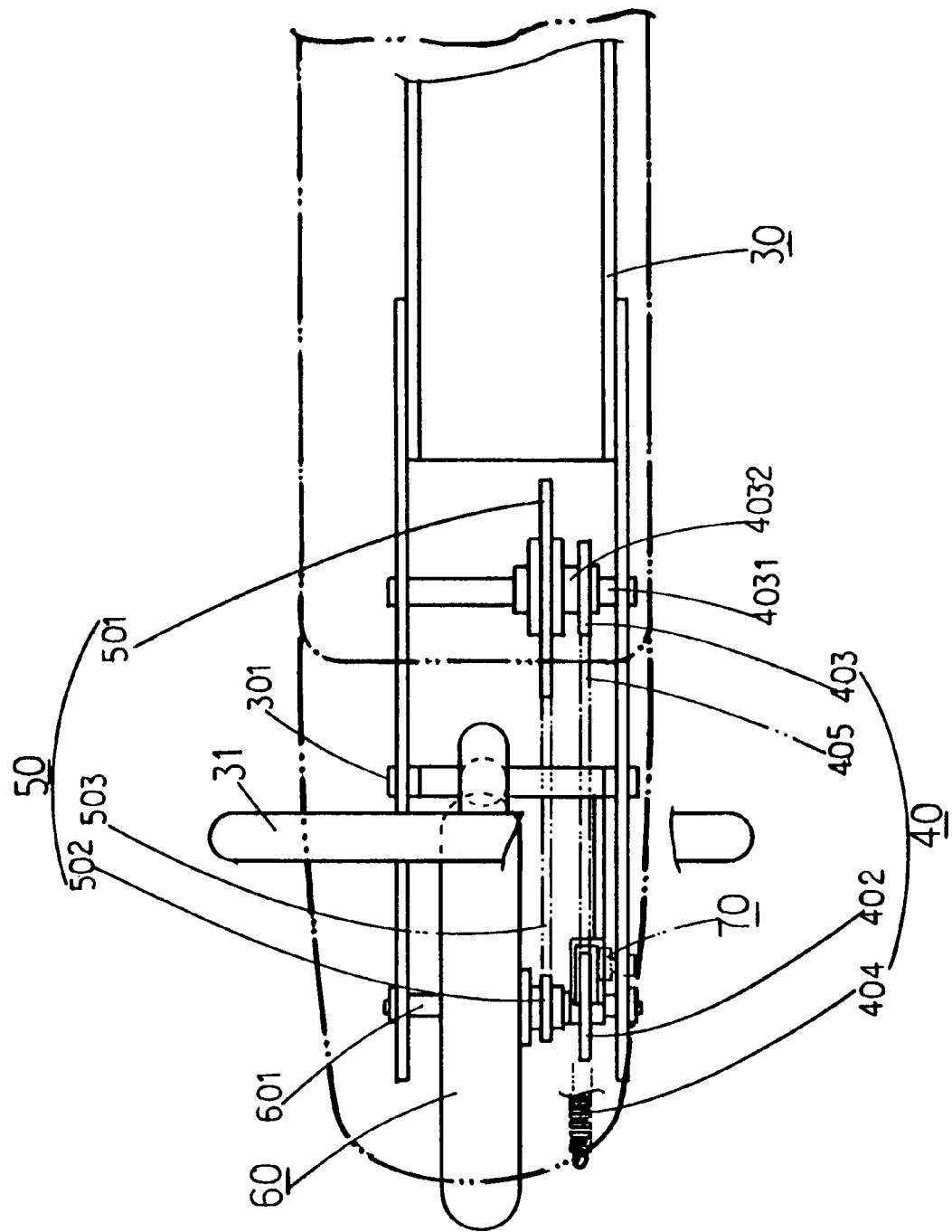
FIG. 6 is a bottom view of a scooter driving structure in accordance with a preferred embodiment as depicted in FIG. 5.

The structure, assembly, technical characteristics and effects of the present invention will become apparent with the detailed description of preferred embodiment together with related drawings as follows:

With reference to FIGS. 4 to 6 for an improved scooter driving structure of the present invention, the structure comprises a step member 31 pivotally installed at a rear end of a scooter platform 30 by a pivotal axle 301 and swung up and down, a first driving module 40 and at least one second driving module 50 installed at a corresponding downward position of the step member 31.

The first driving module 40 comprises a driving rod 401 having an end fixed to a step member 31 and operated together with the step member 31a; a guide wheel 402, freely rotably installed at an axle center 601 of a rear wheel 60 or at any position of the scooter platform 30 proximate to the rear wheel axle center 601; a first driving wheel 403, installed at a position proximate to the rear of the scooter platform 30 through the pivotal axle 4031 and corresponding to the rear wheel axle center 601 precisely; a position restoring element 404, with an end installed at the scooter platform 30; and a first driving belt 405 with an end installed at the position restoring element 404 and another end installed around the first driving wheel 403 and the guide wheel 402 and then installed to another end of the driving rod 401, such that the driving rod 401 and the step member 31 have the effect of resuming their original positions anytime.

The second driving module 50 is installed between the pivotal axle 4031 of the first driving wheel 403 of the first driving module 40 and the axle center 601 of the rear wheel 60, and includes a second driving wheel 501 pivotally installed onto a sheath member 4032 of the first driving wheel 403 and rotated in a one-way direction similar to a flywheel; a second driven wheel 502, pivotally installed at the rear wheel axle center 601 and mounted onto a side of the rear wheel 60; a second driving belt 503, wound between the second driving wheel 501 and the second driven wheel 502.

With the design of the second driving wheel 501 pivotally installed onto the sheath member 4032 of the first driving wheel 403 and rotated in a one-way direction similar to a flywheel, the first driving wheel 403 can drive the second driving wheel 501 to rotate when the first driving wheel 403 rotates clockwise, and the second driving wheel 501 has an idle running when the first driving wheel 403 rotates counterclockwise.

The driving rod 401 includes a position limit brake 70 installed at a position corresponding to the scooter platform 30 and provided for stopping the position resuming driving rod 401.

Figure 7:
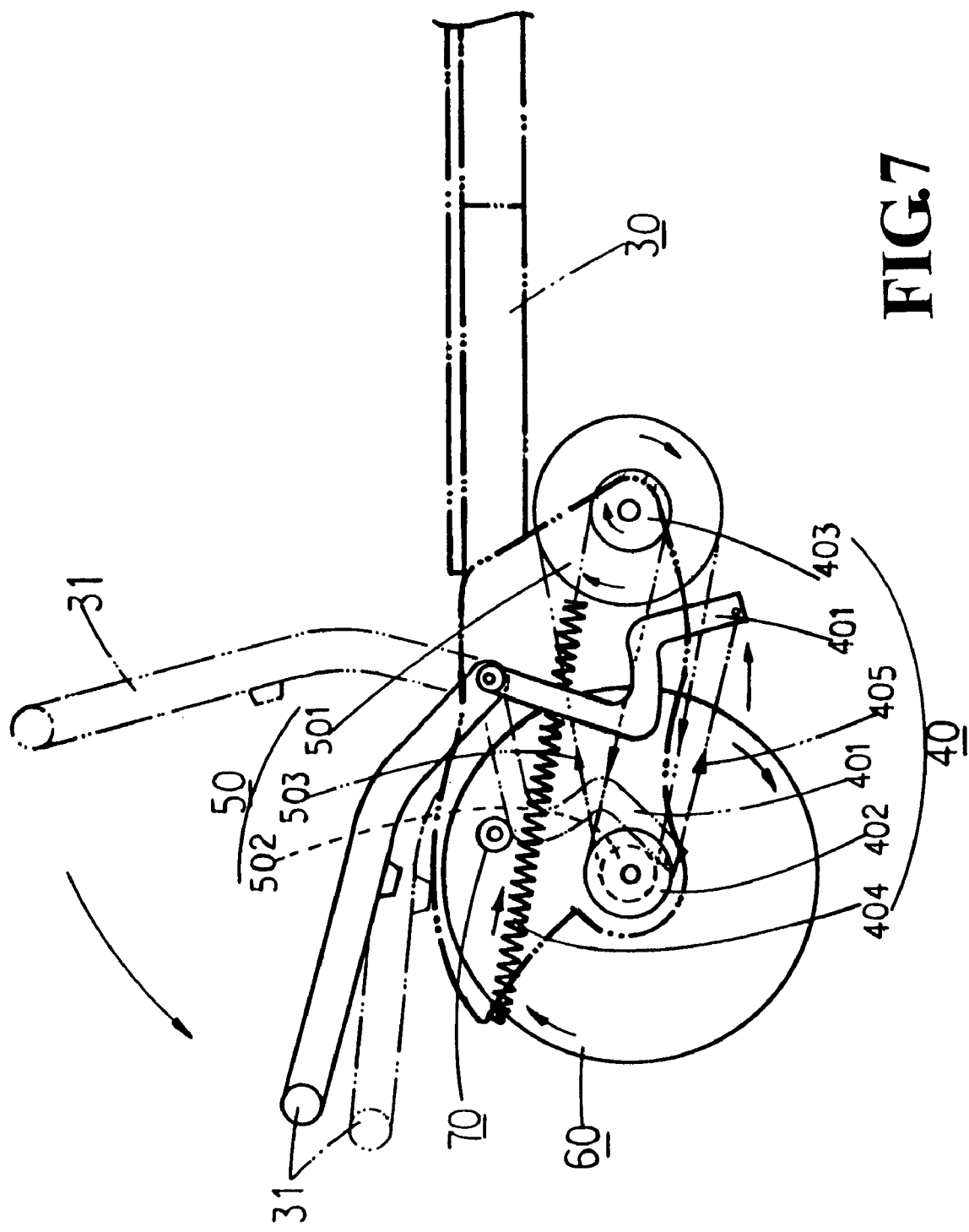
FIG. 7 is a front view of pedaling a step member as depicted in FIG. 5.
Figure 8:
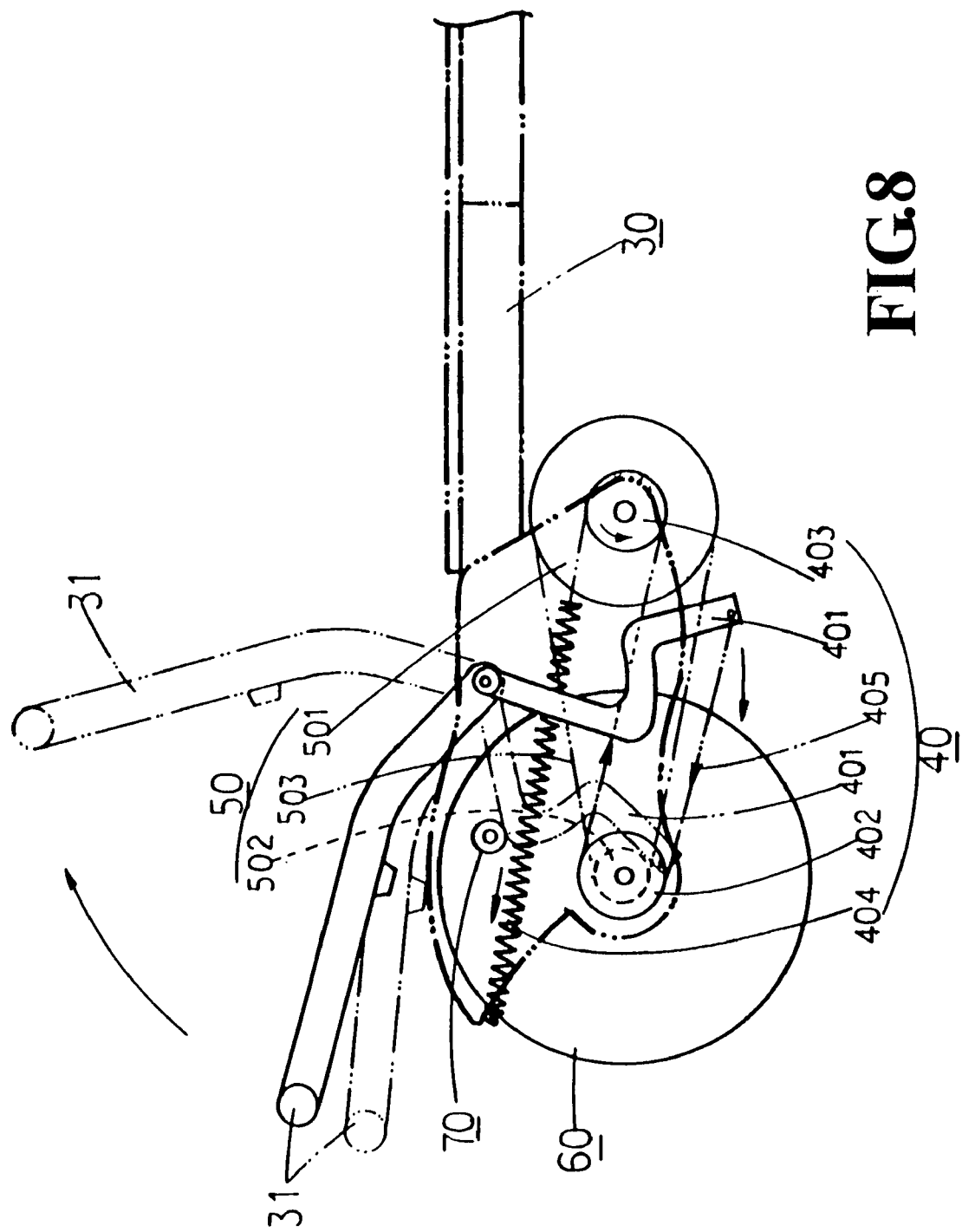
FIG. 8 is a front view of swinging a step member as depicted in FIG. 5 upward for resuming its original position.

In the aforementioned structure of the present invention as shown in FIG. 7, if the upwardly swung step member 31 is stepped downward, the driving rod 401 of the first driving module 40 will be swung together to pull the first driving belt 405 to move forward. Since another end of the first driving belt 40 is wound around the guide wheel 402 and the first driving wheel 403 to drive the position restoring element 404, therefore the driving arm 401 can be swung to pull the first driving belt 405 forward, and the displaced first driving belt 405 will drive the first driving wheel 403 to rotate clockwise immediately and quickly. In the meantime, the second driving wheel 501 of the second driving module 50 is driven to rotate in a one-way direction similar to a flywheel will be rotate when the first driving wheel 403 rotates clockwise, and the second driving wheel 501 will be rotated together with the swing of the step member 31, and the second driving belt 503 drives the second driven wheel 502 and the rear wheel 60 to rotate, so as to achieve the effect of driving the scooter to move forward. When a user releases and lifts the step member 31 as shown in FIG. 8, the swung driving rod 401 pulls the first driving belt 505 by the operation of the position restoring element 404 to resume its original position, and the first driving wheel 403 with the installed first driving belt 405 will have an idle running when the first driving wheel 403 is rotated counterclockwise. When the user lifts the driving rod 401 fixed to the step member 31, the step member 31 resumes its original position by pulling force of the first driving belt 401 and the position restoring element 404, such that the step member 31 is ready in position for another pedaling movement.

Since the position limit brake 70 installed at the scooter platform 30 can stop the position-resuming driving rod 401, and the position of the upwardly swinging movement of the step member 31 integrated with the driving rod 401 can be limited, so as to achieve the safety effect for the operation.

The first driving wheel 403 and the second driven wheel 502 can have a smaller diameter, and the second driving wheel 501 can have a larger diameter, such that when the first driving module 40 and the second driving module 50 are operated in dual transmission, the speed of sliding the scooter can be improved.

The driving wheels and guide wheels are chain wheels or serrated belt wheels, and the corresponding driving belts are chair wheels or serrated belt wheels as well.

The second driving wheel 501 of the second driving module 50 can be integrated with the first driving wheel 403 of the first driving module 40 for transmitting dynamic forces when the second driven wheel 502 is rotated clockwise, and the second driven wheel 502 pivotally installed at the rear wheel axle center 601 and rotated in a one-way direction will be running idle when it rotates anticlockwise. When a user steps on the step member 31, the first driving module 40 and the second driving module 50 can be operated smoothly, quickly and safely to drive the scooter to move forward.

In other words, the present invention at least has the following advantages:

1. The invention provides a simple installation, and an easy and convenient operation.
2. The invention provides a high-speed, stable, safe and full-of-fun exercise effect for users riding on the scooter.

What is claimed is:

1. An improved scooter driving structure, comprising a step member pivotally installed at a rear end of a scooter platform of a scooter and swingable up and down, a first driving module installed downwardly at a position corresponding to the step member, and at least one second driving module, characterized in that the first driving module comprises a driving rod, with an end fixed to the step member and operated together with the step member; a guide wheel, freely and rotably installed at a rear wheel axle center or at a position of the scooter platform proximate to the rear wheel axle center; a first driving wheel, installed at a position proximate to the rear end of the scooter platform by a pivotal axle and corresponding to the rear wheel axle center; a position restoring element, with an end installed to the scooter platform; a first driving belt, with an end installed to the position restoring element, and another end wound around the first driving wheel and a guide wheel and installed at another end of the driving rod, such that the driving rod and the step member have a position resuming force anytime; the second driving module is installed between the pivotal axle of the first driving wheel of the first driving module and the axle center of the rear wheel and includes a second driving wheel installed at the same pivotal axle of the first driving wheel; a second driven wheel pivotally installed at the axle center of the rear wheel; and a second driving belt wound between the second driving wheel and the second driven wheel; thereby, if the step member is stepped downward, the driving rod will be swung together to drive the first driving belt to move forward to rotate the first driving wheel and the second driving wheel, and the second driving belt wound around the second driving wheel and the second driven wheel, and the rear wheel coaxial with the second driven wheel are rotated together to drive the scooter to move; and if the step member is released, the position restoring element will pull the driving rod and resume its original position through the second driving belt to swing the step member upward to its original position.

2. The improved scooter driving structure of claim 1, wherein the second driving wheel is pivotally installed to the first driving wheel and rotated in a one-way direction.

3. The improved scooter driving structure of claim 1, wherein the second driven wheel is pivotally installed to the rear wheel axle center and then fixed to a side of the rear wheel.

4. The improved scooter driving structure of claim 1 or 3, wherein the first driving wheel drives the second driving wheel to rotate when the first driving wheel is rotated clockwise, and maintain an idle running of the second driving wheel when the first driving wheel is rotated counterclockwise.

5. The improved scooter driving structure of claim 1, wherein the driving rod includes a position limit brake installed at a position corresponding to the scooter platform and provided for stopping the position-resuming driving rod.

6. The improved scooter driving structure of claim 1, wherein the second driving wheel and the first driving wheel are integrated, for transmitting a motive force when the second driven wheel is rotated clockwise, and maintaining an idle running and being installed to the rear wheel axle center in a one-way direction when the second driven wheel is rotated counterclockwise.

7. The improved scooter driving structure of claim 1, wherein the first and second driving belts are chain belts, and the corresponding driving wheel and guide wheel are chain wheels.

8. The improved scooter driving structure of claim 1 or 7, wherein the first and second driving belts are serrated belts, and the corresponding driving wheel and guide wheel are serrated belt wheels.

* * * * *